US011216650B2

(12) United States Patent
Malkemus et al.

(10) Patent No.: US 11,216,650 B2
(45) Date of Patent: *Jan. 4, 2022

(54) CUSTOM RECOMMENDATIONS APPLICATION FOR CREATING CARDS

(71) Applicant: PlanetArt, LLC, Calabasas, CA (US)

(72) Inventors: Erik Malkemus, Los Angeles, CA (US); Thomas Dylan Squires, West Hills, CA (US); Roger Bloxberg, Calabasas, CA (US); Todd Helfstein, Oak Park, CA (US)

(73) Assignee: PlanetArt, LLC, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,596

(22) Filed: Nov. 20, 2020

(65) Prior Publication Data

US 2021/0073519 A1 Mar. 11, 2021

Related U.S. Application Data

(63) Continuation of application No. 16/105,718, filed on Aug. 20, 2018, now Pat. No. 10,853,626.

(51) Int. Cl.
| | |
|---|---|
| *G06K 9/00* | (2006.01) |
| *G06T 7/70* | (2017.01) |
| *G06T 1/00* | (2006.01) |
| *G06T 11/60* | (2006.01) |

(52) U.S. Cl.
CPC ........ G06K 9/00288 (2013.01); G06T 1/0007 (2013.01); G06T 7/70 (2017.01); G06T 11/60 (2013.01); *G06T 2200/24* (2013.01); *G06T 2207/30196* (2013.01)

(58) Field of Classification Search
CPC .......................... G06T 11/60; H04N 5/23222; H04N 1/00196; H04N 1/0019; H04N 1/3872; G06F 17/248
See application file for complete search history.

(56) References Cited

U.S. PATENT DOCUMENTS

2015/0169149 A1* 6/2015 Patel ................... G06F 3/04817
715/781
2017/0032553 A1* 2/2017 O'Donovan ......... G06K 9/6215

* cited by examiner

*Primary Examiner* — Eric J Yoon

(57) ABSTRACT

A server including a processor to receive an electronic photo having at least one face from a user and compare the electronic photo with a template having a design element, and a computer implemented algorithm. The processor compares the electronic photo to the template and determines if the face is overlapped by the design element or if the face is cropped out of the photo slot. The processor presents the template combined with the electronic photo to the user only if the design element of the template does not overlap the face in the electronic photo. Multiple templates are compared to the electronic photo, and the templates are displayed based on a priority using criteria.

20 Claims, 12 Drawing Sheets

CUSTOM RECOMMENDATIONS APPLICATION FOR CREATING CARDS

CROSS-REFERENCE TO RELATED APPLICATION

This application is a continuation of U.S. patent application Ser. No. 16/105,718, filed Aug. 20, 2018 (issued as U.S. Ser. No. 10,853,626 on Dec. 1, 2020).

TECHNICAL FIELD

The disclosure relates generally to creating custom cards using web-based software applications, such as greeting cards and holiday cards.

BACKGROUND

Customers sometimes become frustrated with the time and effort it takes in choosing a greeting card design template that is compatible with their photo. Often times, faces in the customer's photo may be blocked by design elements in a selected photo slot or otherwise cropped off the card. This requires the customer to choose another photo that is compatible with a chosen photo slot, or to choose other available photo slots where design elements don't block the faces. This sometimes leads the customer to give up in their endeavor which leads to lost revenue and an unsatisfied customer.

SUMMARY

A server including a processor to receive an electronic photo having at least one face from a user and compare the electronic photo with a template having a design element, and a computer executable algorithm. The processor compares the electronic photo to the template and determines if the face is overlapped by the design element or if the face is cropped out of the photo slot. The processor presents the template combined with the electronic photo to the user only if the design element of the template does not overlap the face in the electronic photo. Multiple templates are compared to the electronic photo, and the templates are displayed based on a priority using criteria.

DETAILED DESCRIPTION

The following description of example embodiments provides information that enables a person skilled in the art to make and use the subject matter set forth in the appended claims, but may omit certain details already well-known in the art. The following detailed description is, therefore, to be taken as illustrative and not limiting. Objectives, advantages, and a preferred mode of making and using the claimed subject matter may be understood best by reference to the accompanying drawings in conjunction with the following detailed description of illustrative embodiments.

The example embodiments may also be described herein with reference to spatial relationships between various elements or to the spatial orientation of various elements depicted in the attached drawings. In general, such relationships or orientation assume a frame of reference. However, as should be recognized by those skilled in the art, this frame of reference is merely a descriptive expedient rather than a strict prescription.

This disclosure comprises a computed implemented software application referred to in this disclosure as a Custom Recommendations (CR) algorithm that was developed primarily to reduce customer effort in choosing a greeting card design template that is "compatible" with their photo. "Compatible" in this disclosure is defined as allowing all detected faces in the customer's photo to appear in a photo slot available to the software application, also referred to as a template, without the faces being blocked by design elements in the photo slot or otherwise cropped off the card, while meeting the requirement of filling the entire photo slot. Greeting card is meant to include holiday cards, graduation announcements, birth announcements, wedding invitations and other customized cards including customer photographs and custom overlays, referred to herein as markings.

Figure 1:
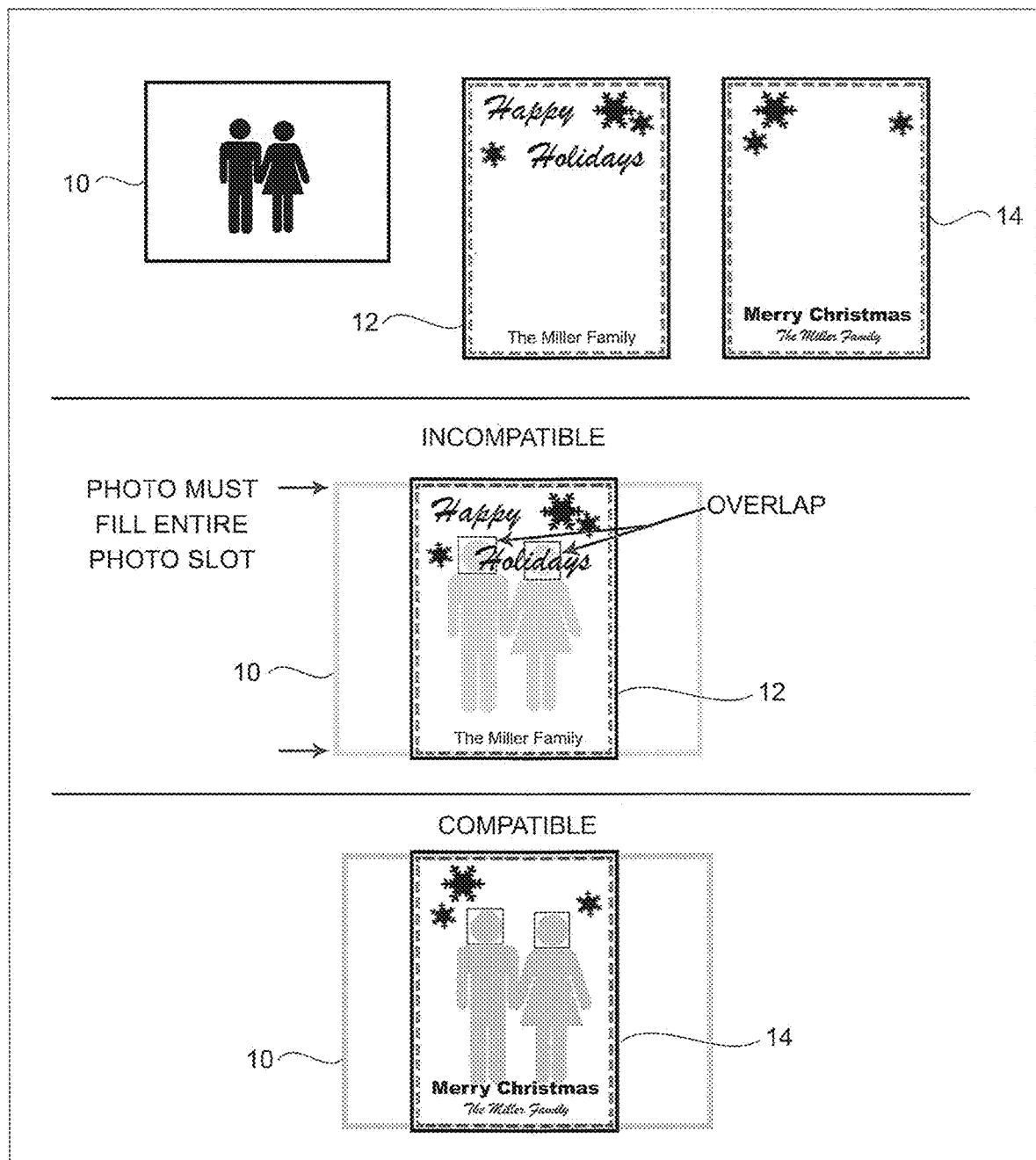
FIG. 1 illustrates an example photo provided by and received from a customer via an application interface tested by the Custom Recommendations (CR) software application/algorithm for combability with two designs.

FIG. 1 illustrates an overview of an example photo 10 provided by and received from a customer via a computer application interface, such as by uploading, and tested by the CR algorithm for combability with two designs, design template 12, and design template 14. As shown in the middle portion of FIG. 1, photo 10 is shown to be incompatible with template 12 due to the overlap of faces of the photo by design elements, such as markings, in the template. As shown in the lower portion of FIG. 1, the photo 10 is shown to be compatible with template 14 because the faces of photo 10 can be positioned by the software application in the template 14 with no overlap of the faces by design elements in the template 14.

There is also shown in FIG. 1 that the constraint on size of the photo 10 in the template 12 and 14 where one dimension of the photo 10 is matched between the photo slot of the photo, filling the photo entirely. The entire photo 10 is combined with the template without alteration.

Figure 2A:
FIG. 2A illustrates a web interface for launching the CR algorithm.

As shown in FIG. 2A, while a customer is browsing a displayed web page comprising a graphical user interface (GUI) 20, a click tab 22 is displayed to the customer for a given category to launch the CR algorithm as an alternate way of browsing the category.

Figure 2B:
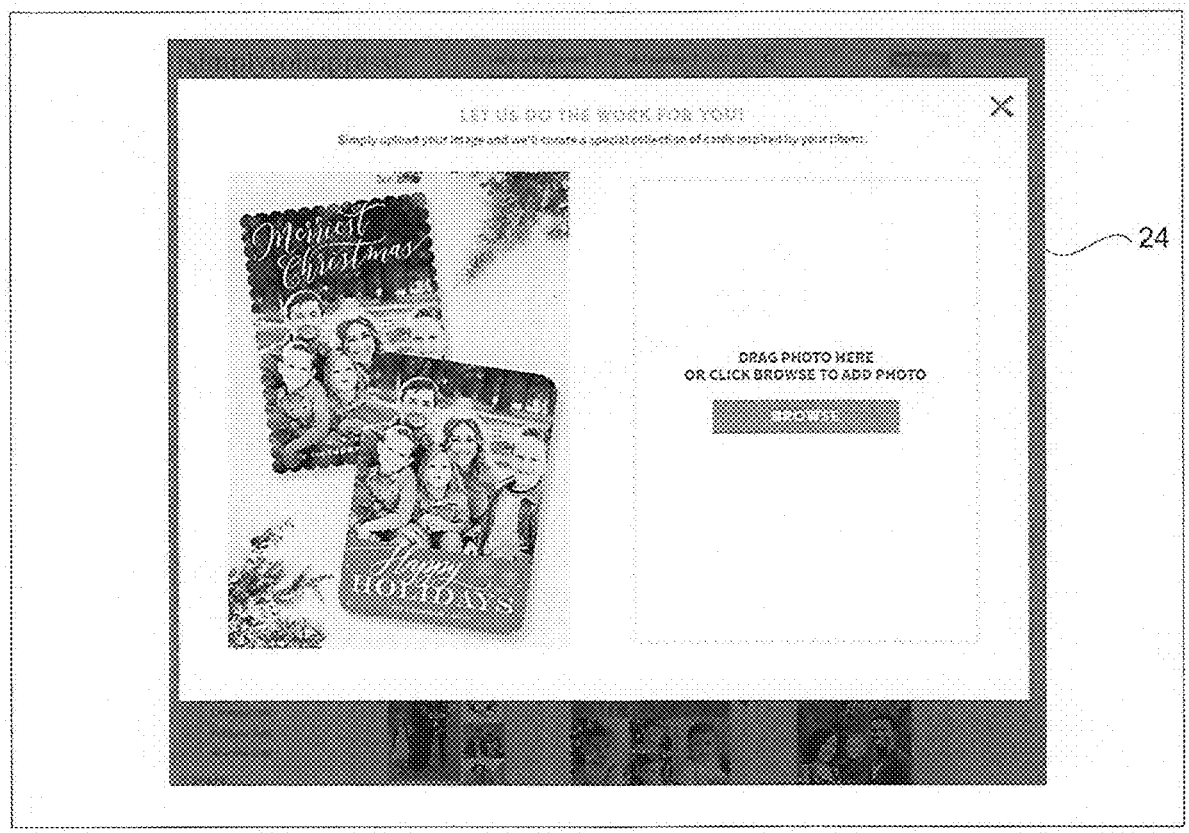
FIG. 2B illustrates a graphical user interface (UI) of the CR algorithm.

As shown at 24 in FIG. 2B, a GUI of the CR algorithm is displayed in response to the user clicking click tab 22 that enables the user to upload a photo 10.

Figure 2C:
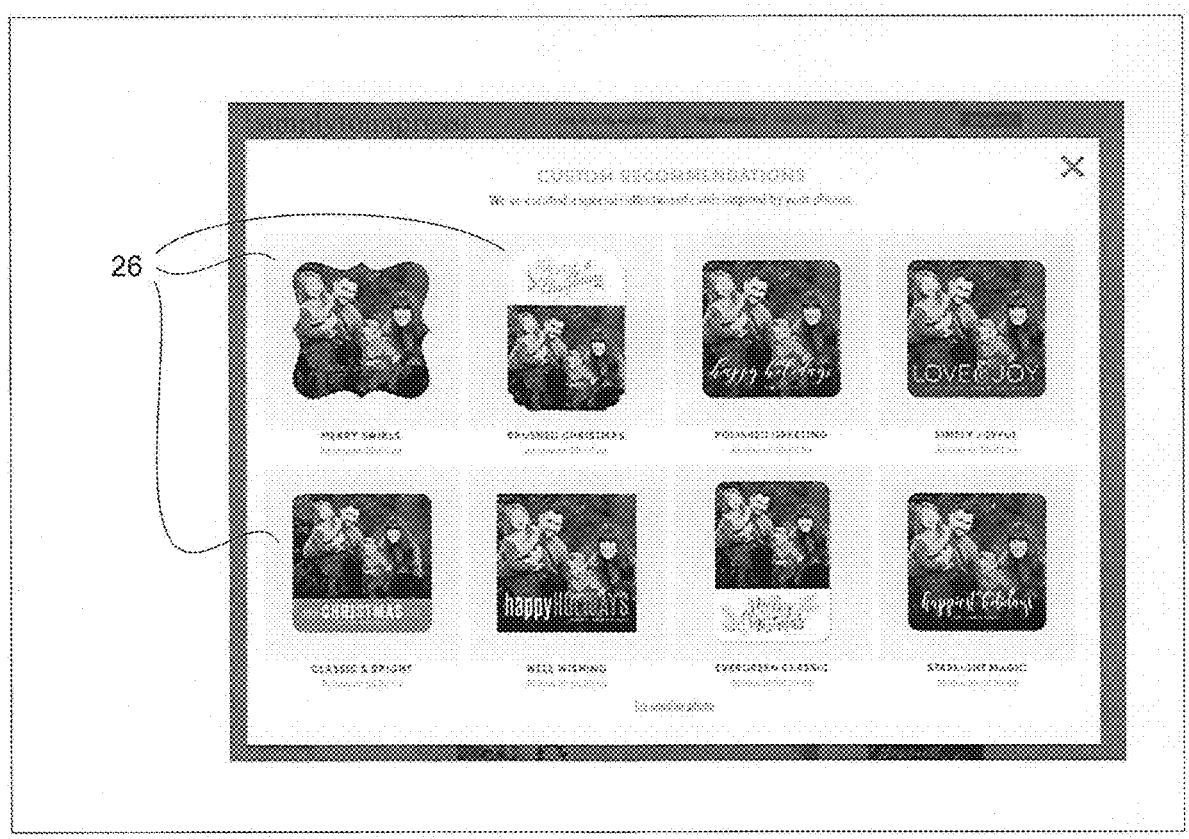
FIG. 2C illustrates compatible relevant design templates from the current category with the customer's photo.

As shown in FIG. 2C, when the user engages the CR algorithm and uploads a photo 10, the CR algorithm finds and presents compatible relevant design templates 26 from a database 34 (FIG. 3) from the current category with the customer's photo 10 shown and optimally positioned in each compatible design template 14. According to this disclosure, incompatible templates 12, namely those that having design elements that overlap faces of the photo 10 or do not allow all faces to show in the photo slot, are eliminated from the result set and not shown to the customer.

The CR algorithm supports single photo designs and one customer photo at a time. In another embodiment, the CR algorithm supports multiple photo templates with multiple customer photos using the same compatibility test and some additional rules to handle the new scenarios that multiple photos introduce.

The CR algorithm prioritizes the design templates 26 as shown in FIG. 2C by aggregating data from other customers who have favorited one or more of the design templates the current user has interacted with (indicating similar taste with the user). The CR algorithm prioritizes the design templates 26 that a group of users has interacted with the most. As a secondary sorting priority, the CR algorithm prioritizes the remaining design templates 26 from the category (the design templates 26 that were not favorited or purchased by the group of users that liked or purchased the same designs the current user liked or clicked in the same order they appear in the traditional browsing method. The final prioritized list is created by a database query performed by a web server 32 shown system 30 in FIG. 3A.

CR Algorithm

Figure 3:
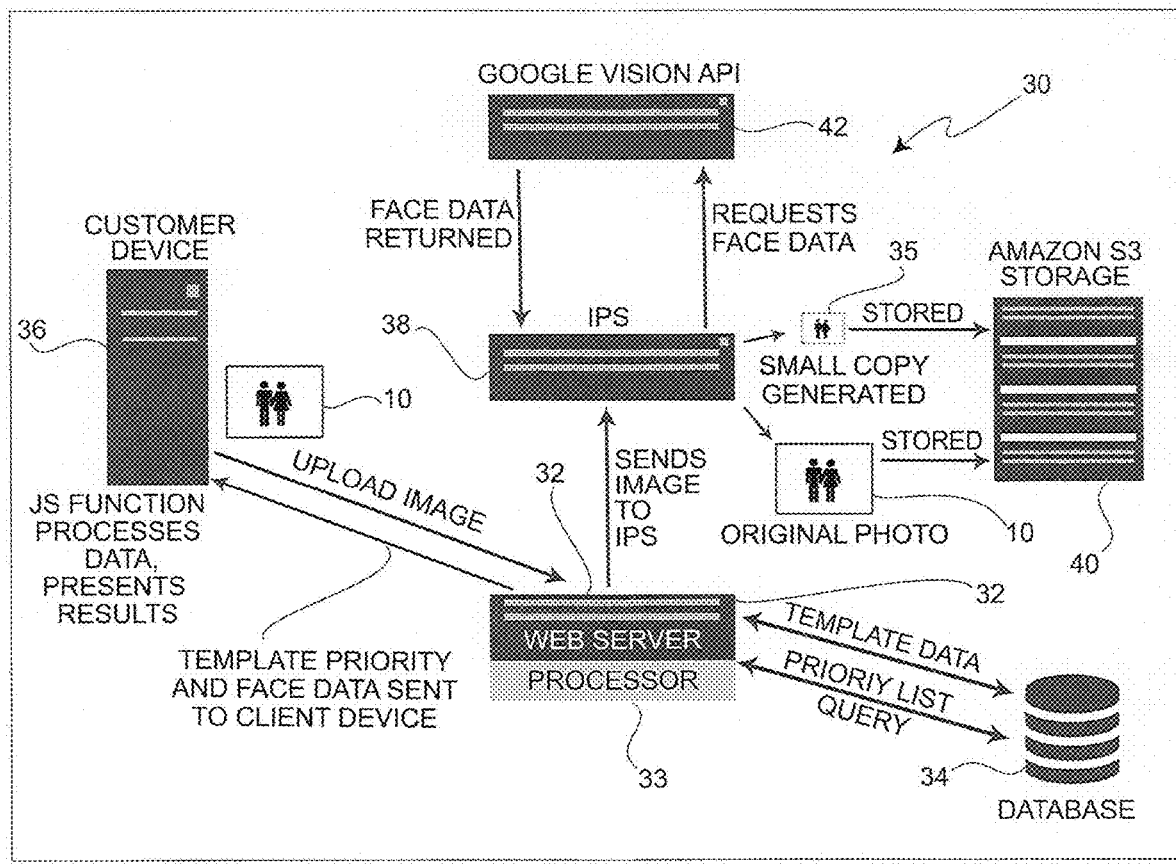
FIG. 3 illustrates as a system and method of operating the CR algorithm.

FIG. 3 illustrates a system 30 and method of operating the CR algorithm to transfer of data and images between a user/customer computing device 36, such as computing device comprising a desktop or laptop computer, mobile phone, tablet computer and the like, and web server 32 and image processing server (IPS) 38. The web server 32 includes an electronic processor 33 and a non-transient computer readable medium including instructions for executing the processor 33 to execute the CR algorithm. A new smaller copy 35 of the photo 10 uploaded by the customer to the web server 32 is generated by IPS 38 and stored in a cloud computing web service 40, such as offered by Amazon Web Services referred to as Amazon 53. The IPS 38 then calls the Google Vision API 42 with the image path and receives back face position data. Web server 32 also runs two database queries with database 34 to gather the prioritized list of design templates 26 and the templates' RTREE coordinate data and photo slot data used to compare with face data from photo 10.

After the prioritized list of design templates 26 is created by web server 32, the CR algorithm compares face data of photo 10 with template data and eliminates template designs that are not compatible, such as shown at 12 in FIG. 1, with the photo 10 the customer has uploaded to web server 32 because the photo 10 cannot be positioned in a way that all faces are shown in the photo slot without obstruction from other design elements of the template while also filling the photo slot entirely.

As shown in FIG. 3, the CR algorithm includes the steps of the IPS server 38 calling the Google Vision API 42 to detect faces in uploaded photo 10 and return coordinate position data.

In advance of the user's visit to the CR algorithm via the web interface shown 20 in FIG. 2A, the web server 32 runs a script to analyze templates stored in database 34 and Amazon S3 40 and records the coordinates of photo slots and any graphic elements that are blocking parts of the photo slots. These data are created in advance, so they are available to the web server 32 when the customer uses the CR algorithm at a hosted site. The data from this script is stored in RTREE format. R-trees are tree data structures used for spatial access methods, i.e., for indexing multi-dimensional information such as geographical coordinates, rectangles or polygons. This allows the web server 32 to reduce the number of calculations required to determine where a photo 10 is compatible with a template 26, as shown in FIGS. 4-5.

Figure 4:
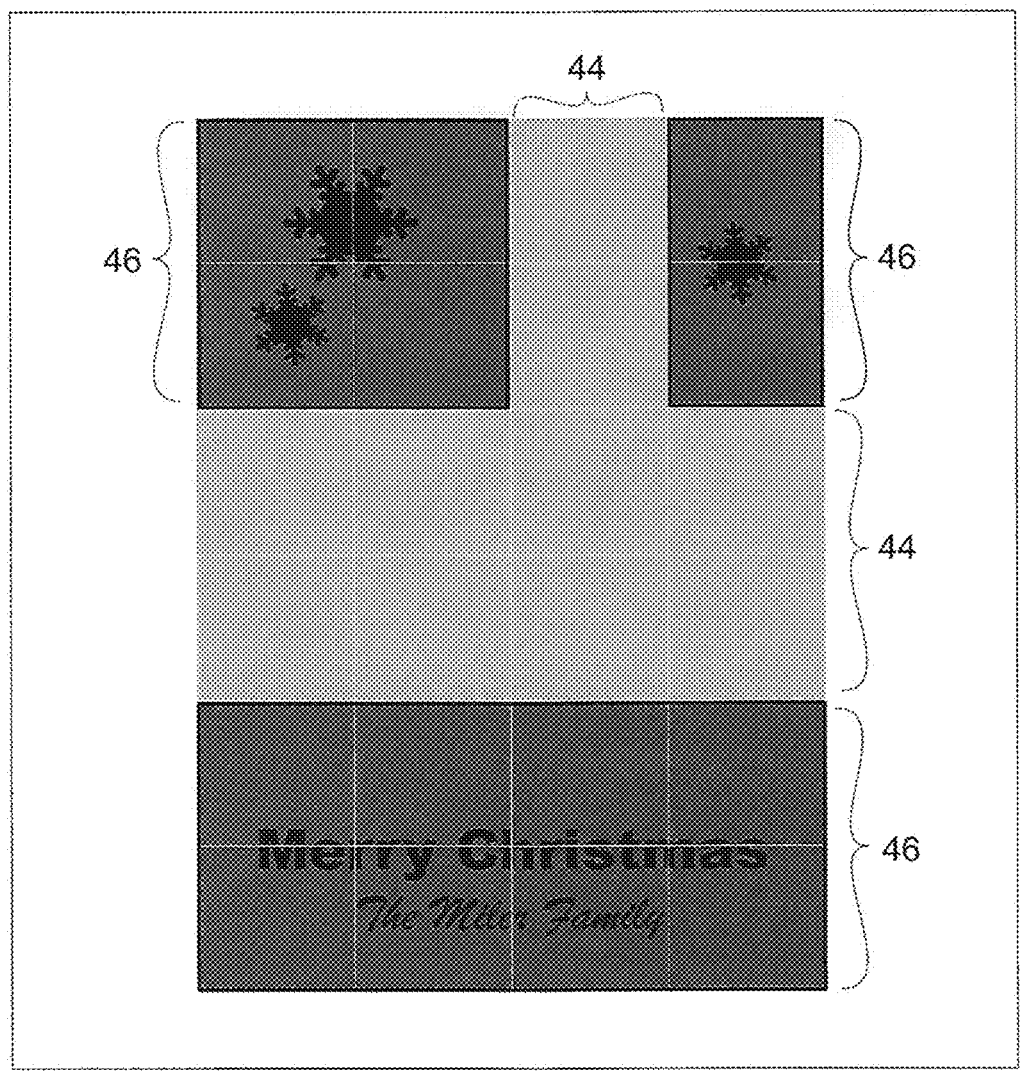
FIG. 4 illustrates RTREE data for a design template 26 at the low granularity view.

FIG. 4 illustrates RTREE data at 44 for a design template 26 at the low granularity view. With only 3 rectangles 46 to check for intersection with faces, in the cases that the faces do not intersect with any of the filled rectangles 46 here, the CR algorithm can determine that design of a template 26 is compatible with an uploaded photo 10. And there is no need to check for compatibility against the more granular view of blocking elements in as shown in FIG. 5.

Figure 5:
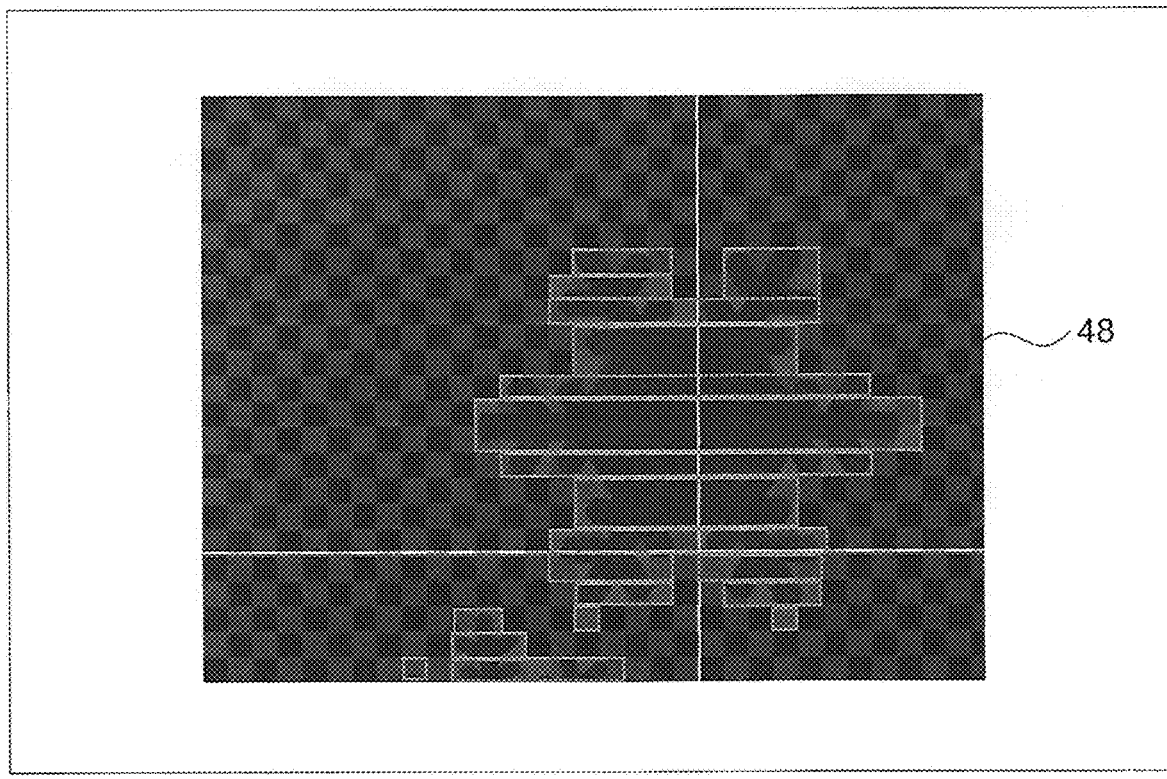
FIG. 5 illustrates RTREE data for the top left corner of design template 26 at the high granularity view.

FIG. 5 illustrates RTREE data 48 for the top left corner of design template 26 at the high granularity view. When the CR algorithm detects that a face rectangle intersects with a blocking element of a template 26 as represented by the low granularity view shown in FIG. 4 above, it indicates there is a possibility that it is blocked by the elements that are nested within the low granularity elements. The CR algorithm checks if the face rectangles intersect with the child rectangles (high granularity) to make the final determination. The CR algorithm checks every face for intersection with the relevant nested child rectangle using recursion.

The CR algorithm compares the Google face position data to a template photo slot and blocking elements data to determine if the photo 10 can be shown in a given template 26 with all detected faces clearly visible, with no blocking elements over the faces and no faces cropped out of the photo slot.

While performing the data comparison above, the CR algorithm works under the constraint that a photo 10 must fill a photo slot in its entirety. One dimension will be filled edge to edge, with no additional photo outside of the photo slot in that dimension, and the other dimension will be cropped as much as needed based on the difference in aspect ratio of the photo and photo slot. See FIGS. 6 and 7.

Figure 6:
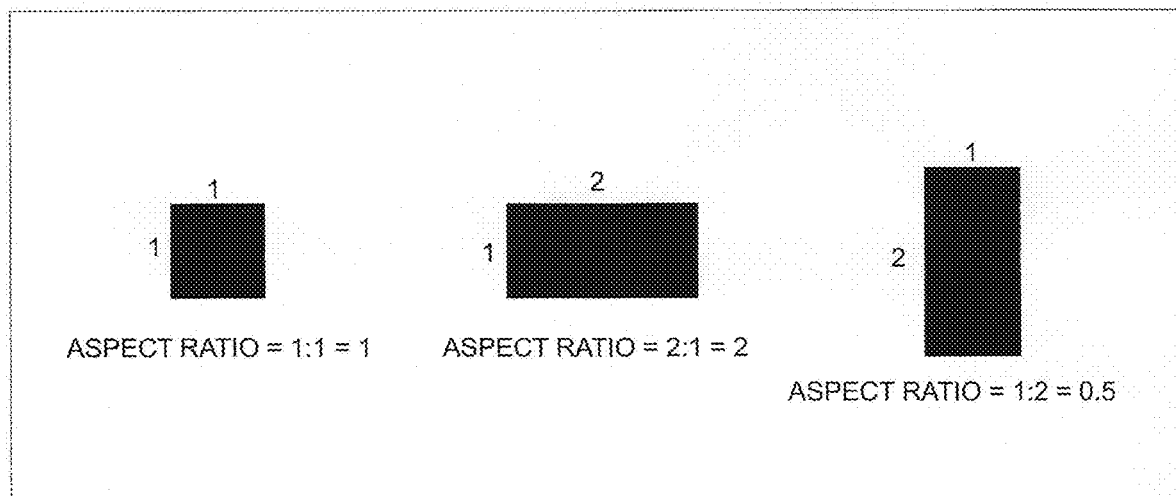
FIG. 6 illustrates Aspect Ratio as a decimal value.

FIG. 6 illustrates Aspect Ratio as a decimal value.

Figure 7:
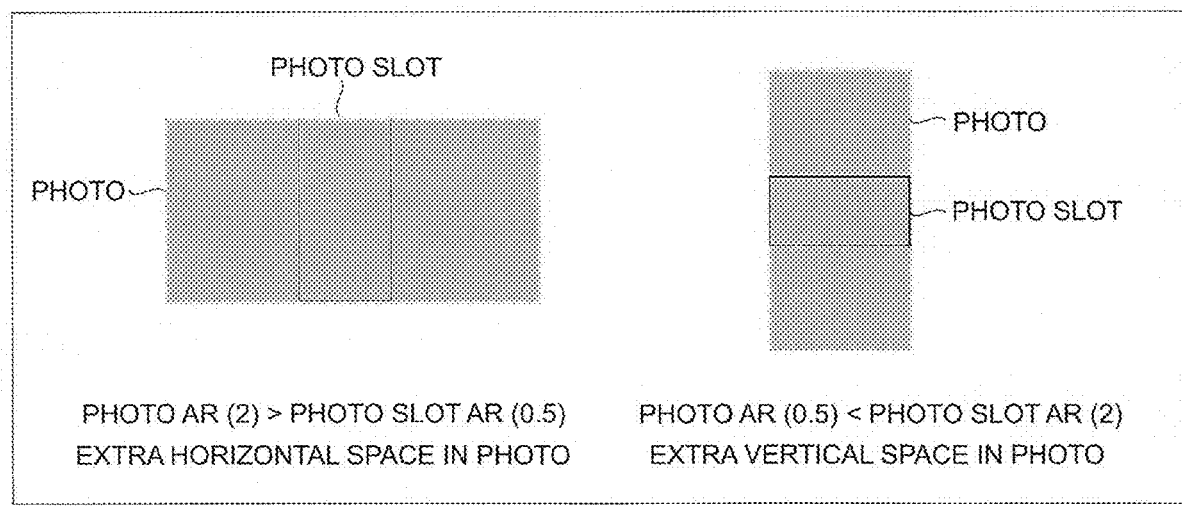
FIG. 7 illustrates two examples of photos shown to have extra space in the horizontal dimension or vertical dimensions based on the relative values of the photo slot's aspect ratio (AR) and the photo's AR.

FIG. 7 illustrates two examples of photos shown to have extra space in the horizontal dimension or vertical dimensions based on the relative values of the photo slot's aspect ratio (AR) and the photo's AR. This shows that when the when the AR of the photo is greater than the AR of the photo slot, there is extra space in the horizontal dimension of the photo (left illustration). When the AR of the photo is less than the AR of the photo slot, there is extra space in the vertical dimension of the photo (right illustration).

The CR algorithm checks iteratively repositioning the photo along the dimension that has extra space.

Figure 8:
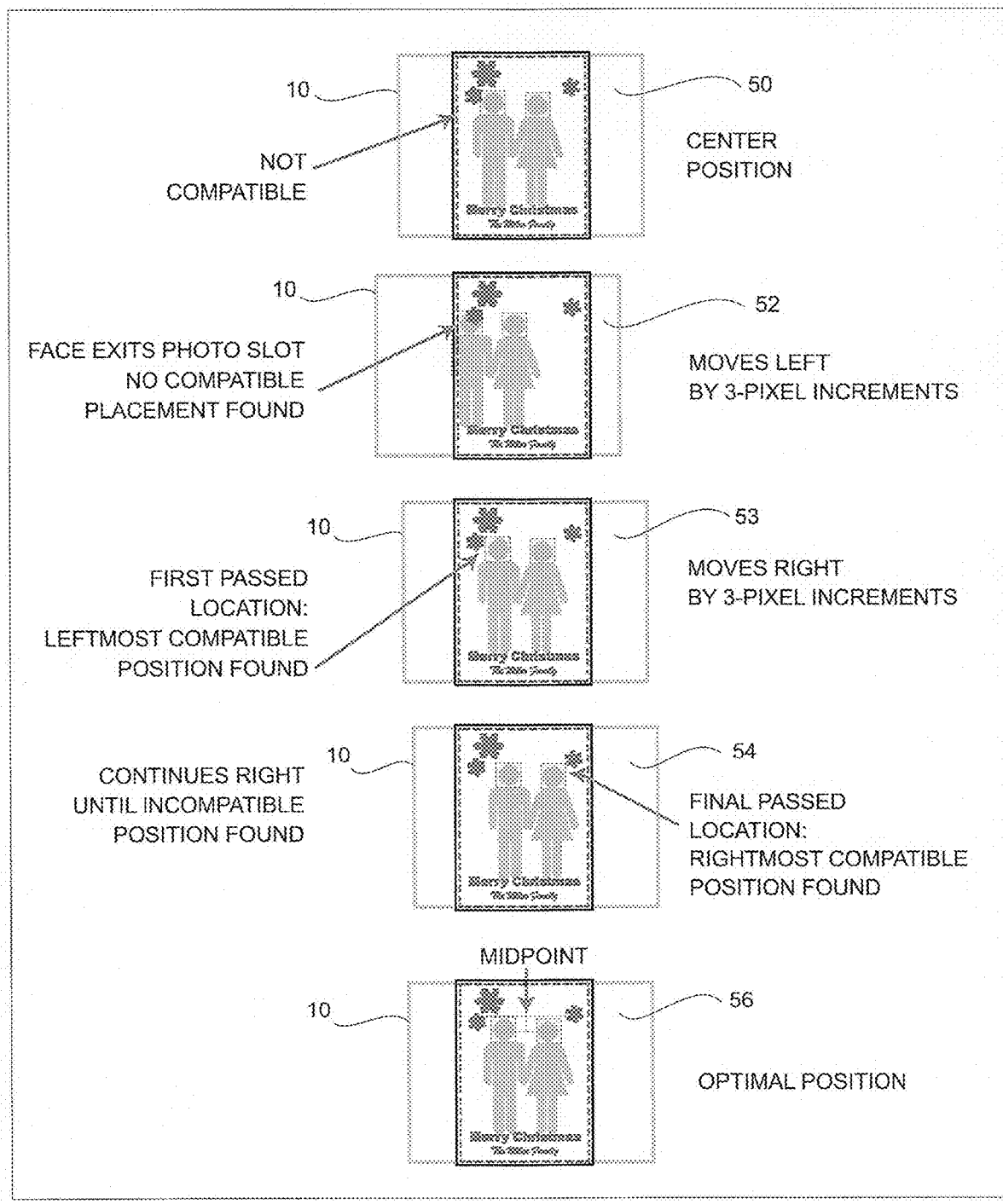
FIG. 8 illustrates the CR algorithm determining the optimum location for the photo based on these rules.

As shown in FIG. 8, the CR algorithm also determines the optimum location for the photo 10 based on these rules:

To find the optimum position, the CR algorithm only moves a photo 10 in one dimension (horizontally or vertically) depending on the relationship of the AR of photo and photo slot (FIG. 7). The CR algorithm first checks the centered position of the photo 10 in the photo slot shown at 50. If it passes, it checks again, moving the photo 3 pixels to the left as shown at 52, continuing until it fails, or one of the faces leaves the left side of the photo opening. The leftmost passed (compatible) position is noted and the CR algorithm then finds the rightmost compatible position in a similar way. When the center position fails the CR algorithm continues checking, moving the photo 10 to the left in 3-pixel increments. If the CR algorithm finds a compatible position, this is considered the rightmost compatible position. The CR algorithm continues until it finds the leftmost compatible position. If the CR algorithm finds no compatible positions to the left, it starts again from center and moves to the right to find the leftmost compatible position and then the rightmost compatible position.

The CR algorithm determines the leftmost and rightmost compatible photo positions and chooses the horizontally centered position between those positions as the optimal position as shown at 53 and 54, respectively, when the photo 10 can be repositioned along the horizontal axis.

When the photo 10 can be repositioned along the horizontal axis, the CR algorithm selects the midpoint of the leftmost and rightmost compatible positions as shown at 56.

When the photo 10 can be repositioned along the vertical axis, the CR algorithm selects the position that is 25% of the way from the topmost and bottommost compatible positions. This is different from horizontal optimum positioning because faces in a photo look better when they are closer to the top of the photo slot. See FIG. 9.

Figure 9:
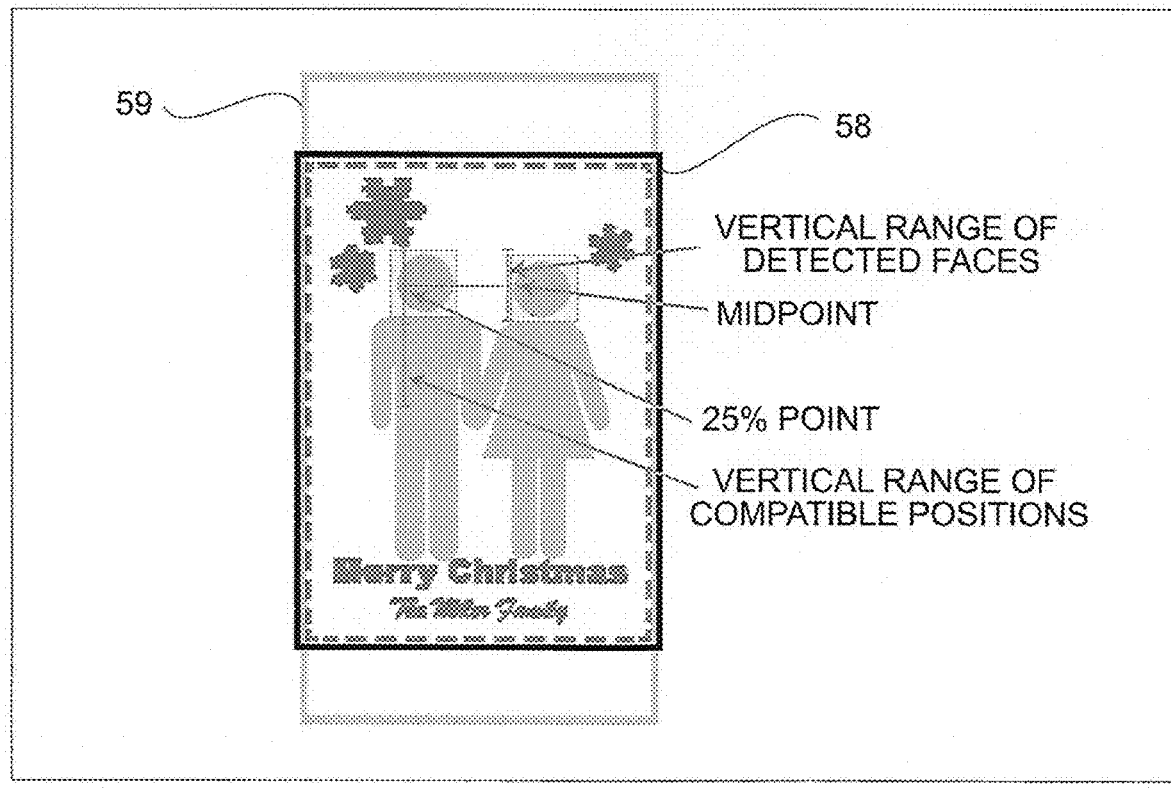
FIG. 9 illustrates the logical difference between finding the optimum position for a photo with extra space in the vertical dimension.

FIG. 9 illustrates at 58 the only logical difference between finding the optimum position for a photo 59 with extra space in the vertical dimension (photo AR<photo slot AR) is that the vertical midpoint of the range of detected faces is aligned with the point that is 25% of the distance from the topmost compatible position to the bottommost compatible position.

After the CR algorithm selects and presents results to the user, the user then clicks one of the recommended template designs 26, and the browser navigates to the product details page of the selected template design and shows the customer's photo in the design template. In the absence of this feature a design template is shown with stock images instead of the customer's photo.

Similarly, when the user clicks personalize from the product details page, the browser proceeds to the personalization step (the designer) with the optimally positioned photo in the template (where the customer can make any other changes to the card supported by the tools, such as editing text, repositioning or replacing the photo. In the absence of this feature the design template is loaded in the designer with no photo in the photo slot.

Prioritization Logic Detail

This section is a detailed look at the logic used to prioritize the list of designs that are shown to the customer in the CR algorithm user flow.

As described, the CR algorithm shows designs to the user prioritized by the frequency they were liked or purchased by users with similar taste to the current user. The CR algorithm achieves this by tracking the designs the user interacts with in two specific ways. The CR algorithm stores in the user's session the design ID of all designs the user accesses the designer step (by clicking personalize from the product detail page). System 30 tracks the designs the user favorites (clicks the heart icon from the details page or thumbnails page). The CR algorithm calls these two sets of design IDs and combines them as the input for the prioritization query.

Summary of the Logic of the Query Used to Creating the Prioritized List

The query has limit of the most recent 500,000 favorites records to prevent the query from becoming slow due to excessive data.

The query also limits the designs that are returned in the output of the function to the current category, based on the URL the user is accessing CR from.

The query uses the input designs list to look up all the customers who favorited those designs. We'll refer to these as "Similar Users."

The query then looks up all the designs that the Similar Users favorited and keep count of how many times each design was favorited by the group. For example, if design 1003 was favorited by 29 of the users from the group, we note that count as this list is generated.

The query then looks up all the designs that the Similar Users purchased and note the number of purchases made by the group per design. This part is limited to the last 6 months of order history to keep the query fast.

The query assigns a point score each favorite of 1 point and to each purchase of 3 points. For example, if design 1003 was favorited by 29 Similar Users and purchased by 10, then it would get 59 points.

The query orders the list by highest points first.

The query adds the remaining designs in the category (with 0 points) to the list after those points design in the order that they appear on the website thumbnails page (a.k.a. product catalog).

The order of the operations in the summary above is for explanation purposes only. This part of the CR algorithm runs in a single SQL: Query, so the MySQL database server does this all at one time from the perspective of system 30. The query runs in less than 1 second.

Creating the Template Data Used in CR

An important part of making the CR algorithm useful to the customer is making it work very fast. Processing numerical coordinate data is much faster than processing image data, so the CR algorithm includes a function to scan the images of all design templates 26 and log the position of blocking elements as coordinate data. New designs and edits to designs are maintained by the same functions described in this section.

System 30 stores template designs in separate layers. Template designs have a base graphic layer, a layer that represents foil (on some designs), and other graphic layers that are moveable by the customer from the designer (on some designs), called raster elements. System 30 stores text as XML data and renders it as images in the designer and in scripts and functions that generate images of the designs. Each of these elements has the potential to cover portions of a photo 10. The CR algorithm composes all of these elements into a single PNG file, which a CR function analyzes and logs the location of blocking elements as rectangles formatted as (x,y,w,h) where x and y are the offset in pixel from the top left corner of the document, and w and h are the width and height of the rectangle starting from that offset. The CR algorithm can check whether two rectangles are intersecting (overlapping) by eliminating the possibility that they don't overlap. For all non-overlapping rectangles, it is possible to draw a vertical line between the two rectangles or it is possible to draw a horizontal line between the two. If neither is possible, we know the rectangles intersect. To test this the two rectangles are converted from x,y,w,h format to two-point format, (x1,y1),(x2,y2) where the first point is the top left corner of the rectangle and the second point is the bottom right corner. To keep the two rectangles separate we'll all an A or B to the front. The following pseudo code tells if the two rectangles intersect or if they are separate.

IF (AX1>BX2||BX1>AX2)//if one rectangle is left of the other

OR (AY1<BY2||BY1<AY2)//if one rectangle is above the other

THEN return "Rectangles do not overlap";

ELSE return "Rectangles overlap";

When applied to this example, it is seen that BX1 (199)>AX2 (158) and that these two rectangles do not overlap. See FIG. 10.

Figure 10:
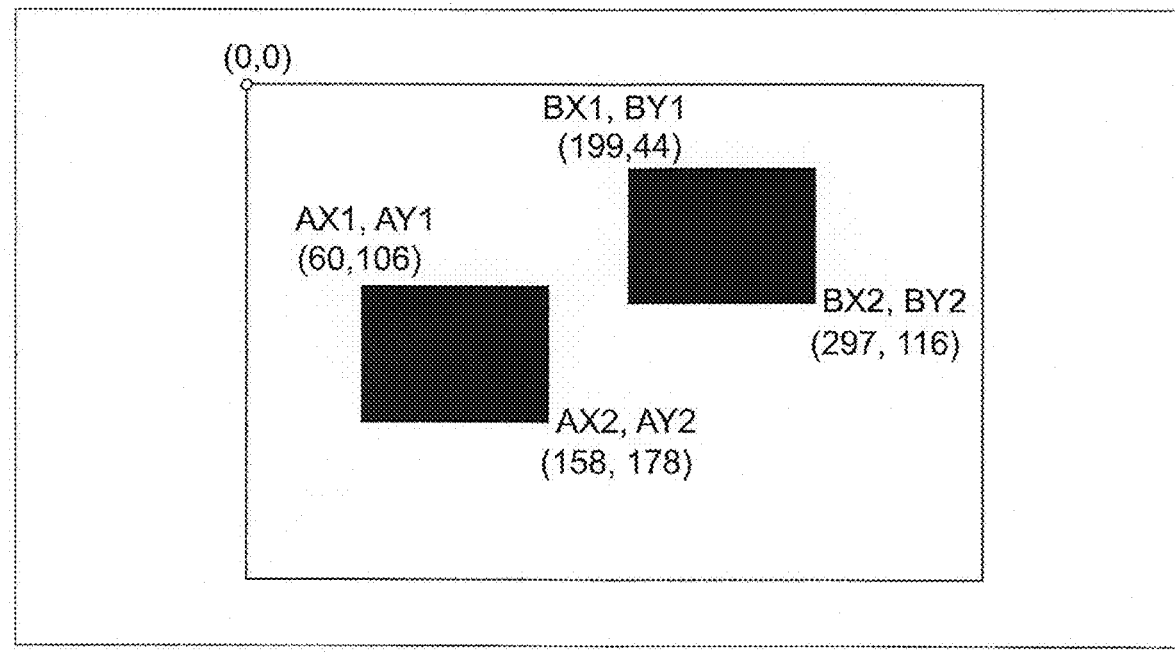
FIG. 10 illustrates an example of two non-overlapping rectangles, shown to not overlap by comparison of their top left and bottom right coordinates.

FIG. 10 illustrates an example of two non-overlapping rectangles 60 and 62, shown to not overlap by comparison of their top left and bottom right coordinates.

The RTREE structure is used to format the data that represents where blocking elements exist. The data is structured with 3 levels of granularity.

Document Container. This is simply a level that contains the entire documents bounds.

Low Granularity. This divides the document into quarters horizontally (so 4 columns) and the vertical divisions vary depending on the card (3 divisions/rows for landscape designs, 4 for square and 6 for portrait).

Figure 11:
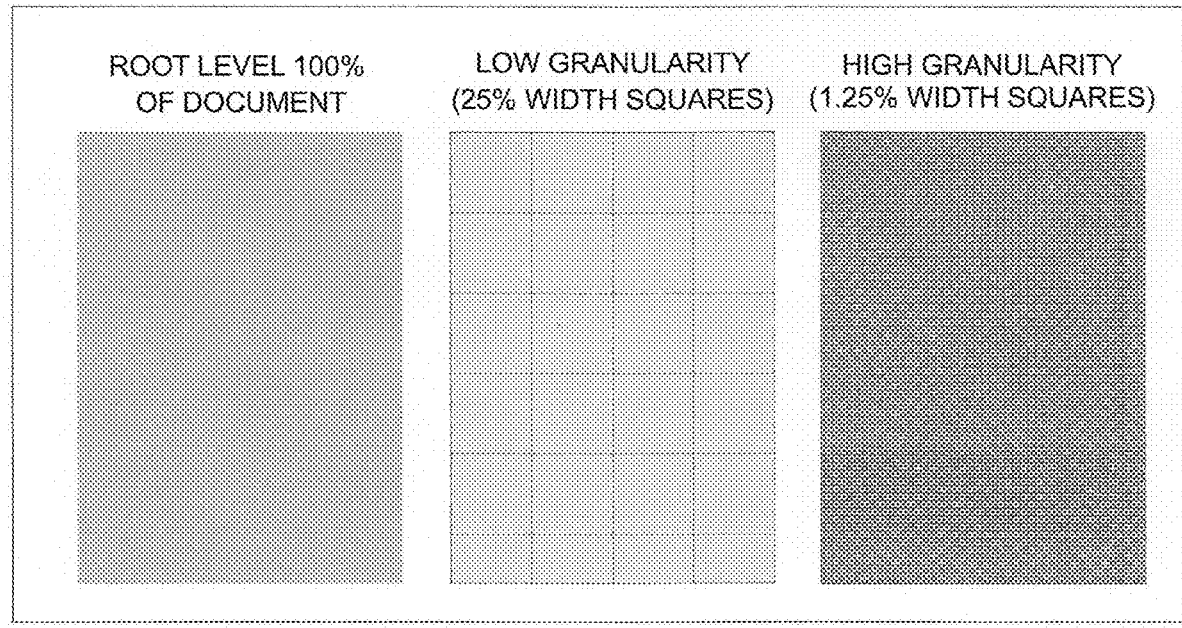
FIG. 11 illustrates providing High Granularity by dividing each low granularity section into 400 cells (20 column×20 rows)

FIG. 11 shows providing High Granularity by dividing each low granularity section into 400 cells (20 column×20 rows).

FIG. 11 shows the three levels of granularity are used to represent the location of blocking elements. As shown, the RTREE structure nests the high granularity rectangles inside of the low granularity rectangle that contains their position.

Figure 12:
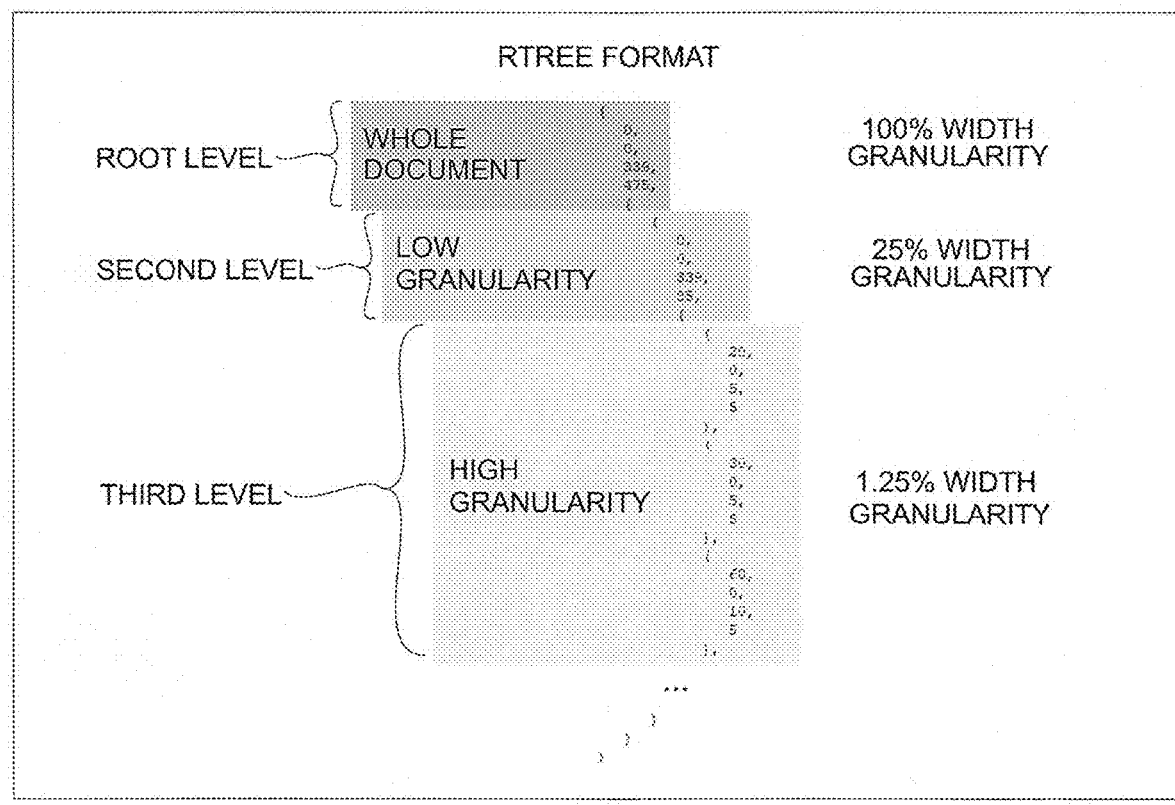
FIG. 12 illustrates sample data formatted in RTREE showing nesting of each level within its parent container.

FIG. 12 illustrates sample data formatted in RTREE showing nesting of each level within its parent container.

The CR algorithm only records data for areas where blocking pixels of opacity of at least 75% are found. Where no pixels are found, the CR algorithm does not include the area in the RTREE data set.

Figure 13:
FIG. 13 illustrates an example template from original (left), the image generated by CR for scanning (middle), and a visual representation of the RTREE date generated by the CR scanning function (right).

FIG. 13 illustrates an example template from original (left), the image generated by CR for scanning (middle), and a visual representation of the RTREE date generated by the CR scanning function (right). For each template design an image is prepared to be scanned by the function that generates the RTREE data for each template design. The image is the composite of all potentially blocking elements (main graphics layer, option foil overlay, optional movable graphics layer, and rendered text). This is then scanned twice, once to find which sections of the second level (low granularity rectangles) contain blocking pixels and then each of the identified rectangles is scanned again storing the high granularity data. For example, FIG. 13 shows a template (black has been added as a background color and all pixels have been color white, for visualization purposes here).

The CR algorithm makes its first scan of this document by checking the alpha (opacity) value of every 3rd pixel to see if it is opaque (higher than 75% opaque, in actuality). If any pixel in the section is found to be opaque, the CR algorithm stores the rectangle to RTREE and moves to check the next. If none of the checked pixels are opaque, it does not write the section to RTREE, as shown in FIG. 13.

To determine whether a face is blocked, the CR algorithm checks to see if rectangle data of the face intersects with any of the high granularity rectangles in the RTREE data set. To optimize the function, the pairs of rectangles compared are minimized. This is done in a few ways. Before we get into that let's consider the calculations required to determine that a face is not blocked by any of the high granularity rectangles, which represent blocking graphics. If we have 2 faces and 1000 rectangles of high granularity, then we would need to check every pair (2000 calls of a function that tells us if the two rectangles in question overlap or not). However, we have reduced the number of computations drastically by these approaches:

The algorithm first compares the Google-detected face rectangles with the low granularity rectangles. If it finds no intersections at this level, there is no blocking at the high granularity level either because all high-granularity rectangles exist within a low granularity rectangle.

When the algorithm does find intersection with 1 or more of the low granularity rectangles, it then checks only the high granularity rectangles that are nested within those intersecting low granularity rectangles. This also reduces the number of computations by eliminating the high granularity rectangles that exist in low granularity rectangles that are found to not intersect with the face rectangles.

In creating the RTREE data the algorithm combines all neighboring squares, first by combining the side-by-side squares, then by combining the rectangles of the same width that are directly above/below one another. This happens during the RTREE scanning process.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:

1. A non-transitory computer readable medium including instructions executable by an electronic processor for creating a customized greeting card, wherein the instructions cause the electronic processor to at least:

process an electronic photo having a face image of a person and a background image that extends beyond the face image, wherein the face image comprises a subset of the electronic photo and is less than the whole electronic photo, and wherein the background image does not comprise any portion of the face image;

compare the face image of the electronic photo with a plurality of greeting card templates each having a design element;

for each greeting card template of the plurality of greeting card templates:

compare the electronic photo to the greeting card template, wherein the comparing of the electronic photo comprises moving the electronic photo to different locations within the greeting card template;

determine whether the respective design element of the greeting card template overlaps the face image of the electronic photo;

select one of the different locations within the greeting card template, wherein, when the electronic photo is located at the selected one of the different locations, the face image of the electronic photo does not overlap the respective design element of the greeting card template; and display at least a portion of the electronic photo combined with the greeting card template in response to the displayed electronic photo being located at the selected one of the locations within the greeting card template, wherein the at least the portion of the electronic photo comprises the face image.

2. The non-transitory computer readable medium as specified in claim 1 further including instructions for causing the electronic processor to:

analyze coordinates of the design element of the plurality of greeting card templates; and position the electronic photo based on the coordinates.

3. The non-transitory computer readable medium as specified in claim 1 further including instructions for causing the electronic processor to:

reject one or more greeting card templates, each of the one or more rejected greeting card templates having a design element that overlaps the face image; and accept two or more of the plurality of greeting card templates, each of the two or more accepted greeting card templates having a design element that does not overlap the face image.

4. The non-transitory computer readable medium as specified in claim 3 further including instructions for causing the processor to:

display the two or more accepted greeting card templates only if the face image is not cropped by the respective template.

5. The non-transitory computer readable medium as specified in claim 3 further including instructions for causing the electronic processor to:

compare the plurality of greeting card templates to the electronic photo; and display the two or more accepted greeting card templates combined with the electronic photo in an order of preference based on criteria.

6. The non-transitory computer readable medium as specified in claim 1 further including instructions for causing the electronic processor to:

use an image processing server to identify portions of the electronic photo that has the face image.

7. The non-transitory computer readable medium as specified in claim 6, wherein the image processing server uses a cloud computing web service.

8. The non-transitory computer readable medium as specified in claim 1 further including instructions for the electronic processor to:

access the plurality of greeting card templates from a data file and compare to the electronic photo.

9. A server, comprising:

a processor; and a memory comprising instructions executable by the processor, the memory and the instructions configured to, with the processor, cause the server at least to:

receive an electronic photo having a face image of a person and a background image that extends beyond the face image, wherein the face image comprises a subset of the electronic photo and is less than the whole electronic photo, and wherein the background image does not comprise any portion of the face image;

compare the face image and the background image of the whole electronic photo with a plurality of greeting card templates each having a design element; and for each greeting card template of the plurality of greeting card templates:

compare the electronic photo to the greeting card template, wherein the comparing of the electronic photo is performed by moving the electronic photo to different locations within the greeting card template;

determine whether the respective design element of the greeting card template overlaps the face image of the electronic photo;

select one of the different locations within the greeting card template, wherein, when the electronic photo is located at the selected one of the different locations, the face image of the electronic photo does not overlap the respective design element of the greeting card template; and display at least a portion of the electronic photo combined with the greeting card template in response to the displayed electronic photo being located at the selected one of the locations within the greeting card template, wherein the at least the portion of the electronic photo comprises the face image.

10. The server as specified in claim 9, wherein the server is further caused to:

analyze coordinates of the design element of the plurality of greeting card templates; and position the electronic photo based on the coordinates.

11. The server as specified in claim 9, wherein the server is further caused to:

reject one or more greeting card templates, each of the one or more rejected greeting card templates having a design element that overlaps the face image; and accept two or more of the plurality of greeting card templates, each of the two or more accepted greeting card templates having a design element that does not overlap the face image.

12. The server as specified in claim 11, wherein the server is further caused to:

display the two or more accepted greeting card templates only if the face image is not cropped by the respective template.

13. The server as specified in claim 11, wherein the server is further caused to:

compare the plurality of greeting card templates to the electronic photo; and display the two or more accepted greeting card templates combined with the electronic photo in an order of preference based on criteria.

14. The server as specified in claim 9, wherein the server is further caused to:

use an image processing server to identify portions of the electronic photo that has the face image.

15. The server as specified in claim 14, wherein the image processing server identifies portions of the electronic photo that has the face image and uses a cloud computing web service.

16. The server as specified in claim 9, wherein the server is further caused to:

access the plurality of greeting card templates from a data file and compare to the electronic photo.

17. A method for creating a customized greeting card, the method comprising:
- processing an electronic photo having a face image of a person and a background image that extends beyond the face image, wherein the face image comprises a subset of the electronic photo and is less than the whole electronic photo, and wherein the background image does not comprise any portion of the face image;
- comparing the face image of the electronic photo with a plurality of greeting card templates each having a design element;
- for each greeting card template of the plurality of greeting card templates:
  - comparing the electronic photo to the greeting card template, wherein the comparing of the electronic photo comprises moving the electronic photo to different locations within the greeting card template;
  - determining whether the respective design element of the greeting card template overlaps the face image of the electronic photo;
  - selecting one of the different locations within the greeting card template, wherein, when the electronic photo is located at the selected one of the different locations, the face image of the electronic photo does not overlap the respective design element of the greeting card template; and
  - displaying at least a portion of the electronic photo combined with the greeting card template in response to the displayed electronic photo being located at the selected one of the locations within the greeting card template, wherein the at least the portion of the electronic photo comprises the face image;
- wherein the method is performed by at least one processor coupled to a memory.

18. The method as specified in claim 17, further comprising:
- analyzing coordinates of the design element of the plurality of greeting card templates; and
- positioning the electronic photo based on the coordinates.

19. The method as specified in claim 17, further comprising:
- rejecting one or more greeting card templates, each of the one or more rejected greeting card templates having a design element that overlaps the face image; and
- accepting two or more of the plurality of greeting card templates, each of the two or more accepted greeting card templates having a design element that does not overlap the face image.

20. The method as specified in claim 19, further comprising:
- displaying the two or more accepted greeting card templates only if the face image is not cropped by the respective template.

* * * * *